June 21, 1960
P. P. HUBER ET AL
2,941,407
DEVICE FOR INTRODUCING MOTION INTO A SEALED INSTRUMENT
Filed Dec. 14, 1953
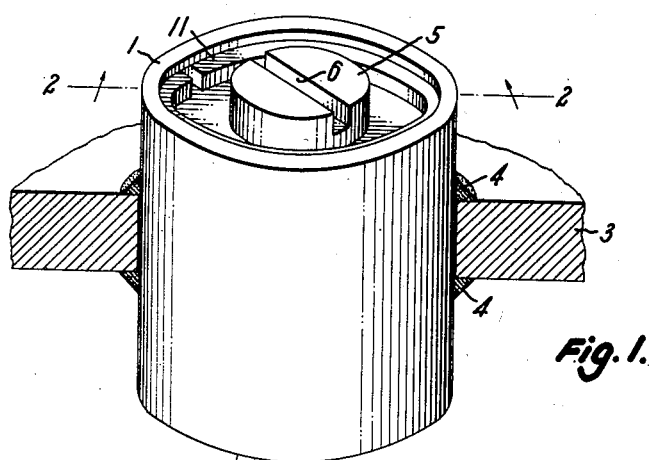
Fig. 1.
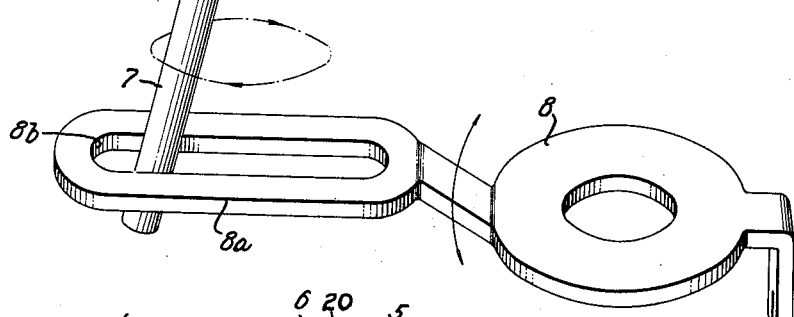
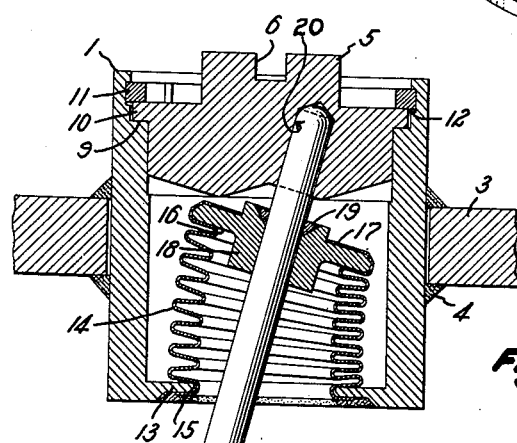
Fig. 2.
INVENTORS
Paul P. Huber
Edward W. Hoyer
BY Gaylor, Cifelli & Jurick
ATTORNEYS
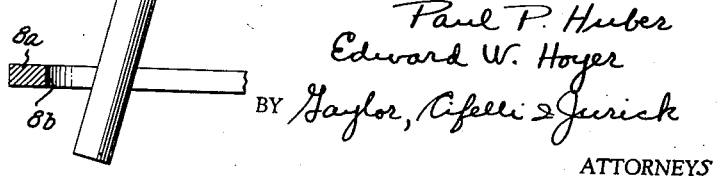

United States Patent Office 2,941,407
Patented June 21, 1960

2,941,407

DEVICE FOR INTRODUCING MOTION INTO A SEALED INSTRUMENT

Paul P. Huber, Hillside, and Edward W. Hoyer, Union, N.J., assignors, by mesne assignments, to Daystrom, Incorporated, Murray Hill, N.J., a corporation of New Jersey Filed Dec. 14, 1953, Ser. No. 397,962

2 Claims. (Cl. 74—18.1)

This invention relates to motion transmitting devices for introducing movement from an external source into a hermetically sealed instrument casing.

It is desirable that the instrument mechanism be hermetically sealed within its enclosing casing, particularly if it is of the sensitive measuring or indicating type as, for example, in electrical measuring instruments. Such a sealed construction is of advantage where the instrument may be exposed to a surrounding atomsphere laden with water vapor, injurious chemicals or gases, dust, or may be subject to changes in ambient pressure.

The general object of this invention is to provide an improved construction for hermetically sealing the zero corrector device that is used for adjusting the moving system of the instrument mechanism.

Another object of this invention is to provide a sealed zero corrector device which may be adjusted when necessary without breaking the hermetic seal.

A more specific object is to provide a sealed zero corrector device for measuring instruments in which the movable element of the corrector is hermetically sealed by a bellows unit that is secured to a wall of the instrument casing and which permits the element to be adjusted as may be necessary from the outside of the casing without breaking the hermetic seal between the interior of the casing and the surrounding atmosphere.

A further specific object is to provide a sealed zero corrector possessing improved ability to maintain large angular rotation movements without undue bearing loading.

The foregoing and other objects and advantages to be derived from the invention will become apparent from the following detailed description when considered with the accompanying drawings which illustrate a preferred form of construction. In the drawings:

Figure 1 is a perspective view of a motion transmitter embodying the invention, and includes a fragmentary section of a typical instrument casing as well as a portion of the instrument mechanism in operative relation thereto, the view being drawn to a scale somewhat larger than the actual size for clear illustration of the structural details; and Figure 2 is, essentially, a vertical sectional view on line 2—2 of Figure 1.

Referring now to the drawings, the motion transmitter or zero corrector device is contained in a tubular housing 1 which is adapted to be hermetically sealed to a wall 3 of the instrument casing by any suitable means such as rings of solder 4, so that it projects an approximately uniform distance from both sides thereof. The zero corrector includes a generally symmetrical imperforate adjustment top plate or cap 5 having a diametral slot 6 provided in a coaxial outwardly-projecting boss thereof and opening outwardly for receiving a screwdriver blade or other adjusting tool and an integral pin 7, desirably of uniform section from end to end, for transmitting the rotary action of cap or generally symmetrical rotatable adjustment top plate 5 to a spring abutment 8 of the instrument mechanism. For the purpose of this adjustment, the spring abutment 8 is provided, as is well known in the art, with a lateral extension 8a in which an elongated slot 8b is formed to receive the pin 7.

Referring now to Figure 2 in particular, the zero corrector tubular housing 1 is provided with an offset annular shoulder 9 which constitutes a 360° bearing surface for the annular flange 10 of the plate 5. The plate 5 is removably secured within the housing by means of split retaining ring 11 which expands externally into the undercut groove 12 provided in the interior wall of housing 1. The lower end of the housing is provided with a central opening defined by the inwardly projecting shoulder 13. A tubular yieldable member 14, impervious to gas and desirably of the bellows type, is sealed at its lower open end to shoulder 13 by any suitable means, such as a ring of solder 15. Preferably, the yieldable member 14 is constituted by a metallic bellows whose upper end surrounds and is closed by a rigid end disk or button 16 to which it is secured and sealed by a solder ring 17. Disk 16 which is disposed in the approximate plane of the wall 3, is provided with a central boss 18 through which the pin 7 passes, and the latter is secured and sealed to disk 16 in axial relation thereto by solder 19, or the disk 16 may be formed as part of said pin.

The top end of pin 7 is freely disposed and journalled so as to be rotatable coaxially in an angled bore or pocket 20 provided in the lower face of top plate 5, opening only inwardly and offset or disposed eccentrically from the axis thereof with its axis extending at an angle to that of said plate. The hole 20 is of substantially the same diameter as pin 7 so as to form a sleeve bearing for the latter. As indicated in Figure 2, the lower face of top plate 5 may be suitably surfaced, as by countersinking to any desired angle, to provide top clearance for the central portion of disk 16 as well as a convenient lead surface for the drilling of angular hole 20. The outer edges of the lower face of top plate 5 are suitably chamfered to provide top clearance for the outer extremities of disk 16 and the edge of bellows 14.

The operation of the motion transmitter or zero adjuster should now be apparent. Rotation of top plate 5 guides the upper end of pin 7 along an arcuate path about an axis which coincides with the axis of the housing 1. The lower end of pin 7 which extends, as a cantilever requiring no other fixed support, inwardly beyond the housing a distance greater than the length of its portion enclosed in said housing, because of its eccentric angular positioning, executes a complementary arcuate movement, as indicated by the arrow in Figure 1, and this motion is transmitted through the slot connection into corresponding angular movement of spring abutment 8. By virtue of the long bearing surface provided for the slotted cap 5 by shoulder 9, it is possible to secure large angles of arcuate movement of the lower end of pin 7 without undue bearing loading.

The bellows 14, disk 16 and pin 7 do not rotate with respect to housing 1, but merely change their angular relation with respect to the axis of the housing. Thus, bellows 14 may flex from side to side without impairing the solder seals.

It is realized that other constructions have been proposed for a bellows type of zero corrector for sealed electrical instrument casings as we are aware of the patent to Anthony H. Lamb No. 2,513,184, but the zero corrector according to this invention is characterized by comparatively few and simple parts which may be readily assembled and mounted upon the top wall of the instrument casing.

In conclusion, it will be understood that the principles underlying the invention may be applied to various types of electrical measuring instruments, and also that various changes in the construction and arrangement of parts of the illustrated embodiment may be made, as, for example, by utilizing a one piece construction for disk 16 and pin 7 and eliminating solder 19, without departing from the spirit and scope of the invention as defined in the appended claims.

Having now described our invention in detail in accordance with the patent statutes what we desire to protect by Letters Patent of the United States, is set forth in the following claims.

We claim:

1. A sealed motion transmitter for introducing rotary motion into a sealed instrument casing comprising, a tubular housing positionable in sealed relation to a wall of said casing so that it projects both ways therefrom, a rotatable imperforate plate seated coaxially in the outer end of said tubular housing and formed with a coaxial outwardly-extending boss formed with a diametral slot opening outwardly for receiving an adjusting tool and a generally cylindrical eccentric pocket opening only inwardly with its axis extending at an angle to that of said plate, an impervious and flexible tubular member closed at one end which is positioned so as to lie approximately in the plane of the casing wall and sealed at the other end to the inner end of said tubular housing, and an integral pin of uniform section from end to end, having one end freely received in, allowing for only turning and axial movement, and rotatable coaxially of and within said pocket in the plate so as to extend therefrom as a cantilever requiring no other fixed support and extending through and secured intermediate its ends and at the approximate mid point between the ends of the housing to the closed end of said flexible tubular member, the other end of said pin extending beyond said housing.

2. In combination with a sealed instrument casing, a sealed motion transmitter for introducing rotary motion thereinto comprising, a tubular housing positioned in sealed relation to a wall of said casing so that it projects an approximately uniform distance from both sides thereof, a generally symmetrical imperforate adjustment plate rotatable coaxially and removably secured in the outer end of said tubular housing beyond the plane of said wall, said plate being formed with a generally cylindrical eccentric pocket opening only inwardly with its axis extending at an angle to that of said plate and said plate having a coaxial outwardly-projecting boss carrying a diametrical slot opening outwardly for receiving an adjusting tool; an impervious and flexible tubular bellows-type member telescoped within said tubular housing and having one end disposed inwardly of the plane of said wall and sealed to the inner end of said housing; and an integral pin of uniform section from end to end extending through and secured intermediate its ends in the approximate plane of said wall to close the other end of said flexible tubular member, one end of said pin extending freely into said pocket so as to be rotatable coaxially therein, otherwise allowing for only axial movement, and its other end portion extending as a cantilever requiring no other fixed support, inwardly beyond said housing to, upon rotation of said plate, transmit rotary motion to a part sealed in said casing.

References Cited in the file of this patent

UNITED STATES PATENTS

| | | |
|---|---|---|
| 2,454,340 | Reichel | Nov. 23, 1948 |
| 2,513,184 | Lamb | June 27, 1950 |
| 2,617,307 | Knudsen | Nov. 11, 1952 |
| 2,659,569 | Ehlke | Nov. 17, 1953 |
| 2,697,356 | Knudsen | Dec. 21, 1954 |

FOREIGN PATENTS

| | | |
|---|---|---|
| 555,879 | Great Britain | Sept. 10, 1943 |
| 844,831 | Germany | July 24, 1952 |